United States Patent
Katou et al.

(10) Patent No.: US 6,983,817 B2
(45) Date of Patent: Jan. 10, 2006

(54) POWER STEERING DEVICE

(75) Inventors: Hideki Katou, Kariya (JP); Atsuhisa Asada, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 17 days.

(21) Appl. No.: 10/770,444

(22) Filed: Feb. 4, 2004

(65) Prior Publication Data

US 2004/0182640 A1 Sep. 23, 2004

(30) Foreign Application Priority Data

Mar. 18, 2003 (JP) .................................. 2003-073194
Mar. 18, 2003 (JP) .................................. 2003-073277

(51) Int. Cl.
*B62D 5/04* (2006.01)

(52) U.S. Cl. ...................... 180/446; 180/443; 701/41
(58) Field of Classification Search .............. 180/446, 180/443; 701/41, 42
See application file for complete search history.

(56) References Cited

U.S. PATENT DOCUMENTS

| | | | | |
|---|---|---|---|---|
| 4,448,275 A | * | 5/1984 | Kitagawa et al. | 180/446 |
| 6,554,096 B2 | * | 4/2003 | Tokumoto | 180/446 |
| 6,594,568 B2 | * | 7/2003 | Matsuoka | 701/41 |
| 6,595,074 B2 | * | 7/2003 | Shimizu et al. | 73/862.333 |
| 6,691,008 B2 | * | 2/2004 | Kondo et al. | 701/41 |
| 6,827,177 B2 | * | 12/2004 | Asada et al. | 180/446 |
| 2002/0173891 A1 | | 11/2002 | Kazushi et al. | |
| 2005/0065686 A1 | * | 3/2005 | Kohno et al. | |
| 2005/0103561 A1 | * | 5/2005 | Endo et al. | |

FOREIGN PATENT DOCUMENTS

| | | |
|---|---|---|
| JP | 2000-168597 | 6/2000 |
| JP | 2001-194251 | 7/2001 |
| JP | 2001-341656 | 12/2001 |

* cited by examiner

*Primary Examiner*—Tony Winner
(74) *Attorney, Agent, or Firm*—Oblon, Spivak, McClelland, Maier & Neustadt, P.C.

(57) ABSTRACT

A power steering device is provided which is capable of preventing a wrong operation from occurring in a steering control state even when an initial torque of torque detection was not detected normally due to a human error. Upon receipt of a trigger signal, a CPU reads an initial setting program from a program storage area of a ROM and executes the initial setting program in the following order of steps. That is, the CPU detects by torque detection an initial torque which is generated primarily by the cause of the difference between origin positions of a pair of resolvers 12, 12 which together with a torsion bar constitutes the torque detection. Then, the CPU operates an assist motor to rotate a steering handle from a neutral position a predetermined rotational angle in one direction about the handle axis to stop the steering handle at a first judgment position and detects a first judgment torque value by the torque detection with the steering handle being stopped at the first judgment position. Then, the CPU rotates the steering handle from the neutral position the same angular position in the other direction to stop the steering handle at a second judgment position and detects a second judgment torque value by the torque detection with the steering handle being stopped at the second judgment position. Further, the CPU judges whether the initial torque has been detected normally or not, based on the first and second judgment torque values.

4 Claims, 6 Drawing Sheets

FIG. 4
(a) NORMAL  (b) ABNORMAL
(i) 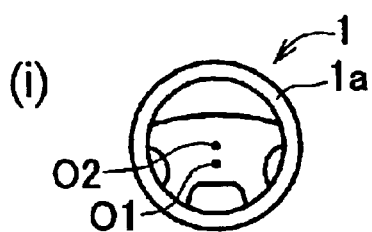 (i) 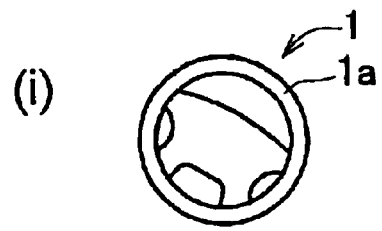
(ii) 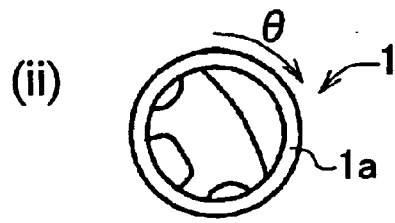 (ii) 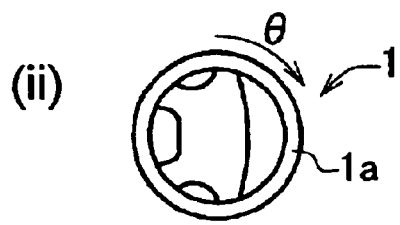
(iii) 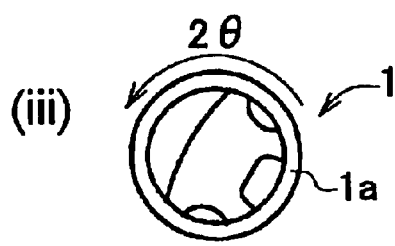 (iii) 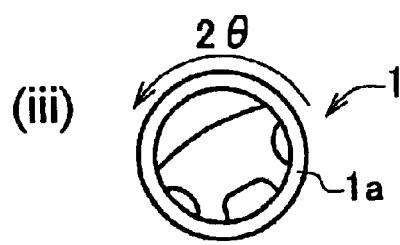

POWER STEERING DEVICE

INCORPORATION BY REFERENCE

This application is based on and claims priority under 35 U.S.C. sctn. 119 with respect to Japanese Applications No. 2003-73277 and No. 2003-73194 both filed on Mar. 18, 2003, the entire contents of which are incorporated herein by reference.

BACKGROUND OF THE INVENTION

1. Field of the Invention

The present invention relates to a power steering device for vehicles such as automobiles or motorcars.

2. Discussion of the Related Art

Heretofore, as steering devices of vehicles and particularly, as those of automobiles or motorcars, there have been widespread power assist mechanisms (power steering devices) for steering manipulation. For this reason, these days such power steering devices are installed on almost all of the motorcars manufactured in factories. Therefore, it is often the case that the repair or replacement of such power steering devices is done at car dealers regardless of whether new cars or used cars. Generally, such power steering devices are of the type that the steering torque applied to a handle shaft through a steering handle is detected by torque detection means and that a drive power corresponding to the detected torque is generated by assist power generating means such as an electric motor and is transmitted to steerable wheels, as exemplified in Japanese unexamined, published patent applications No. 2000-168597 and No. 2001-341656.

By the way, in assembling or inspecting the aforementioned power steering devices in the manufacturing stage in factories or in repairing or replacing the same at the stage of car dealers, cares have to be taken to the following respects.

(1) Residual torque remaining as hysteresis between the steering handle and the torque detection means; this means the torque which is generated as imperfect returning of the steering handle by the cause of friction or the like in a transmission system between the steering handle and the torque detection means even after the applied torque has been removed.

(2) Origin torque caused by the difference in origin position between a pair of angle detection sensors in the case that the torque detection means is composed of a torsion bar and the pair of angle detection sensors installed apart in the axial direction of the torsion bar. In the case of a pair of angle detection sensors like, e.g., twin resolvers as disclosed in Japanese unexamined, published patent application No. 2001-194251, it is quite difficult in ordinary manufacturing sites to assemble both sensors with the mounting angle positions thereof being in completely coincidence with each other, and thus, it is unavoidable that the torque detection means detects and indicates a torque which includes the torque (origin torque) depending on the difference between origin positions of the both sensors.

Accordingly, when the steering handle is stationarily held at a neutral position in the steering direction with the applied torque having been removed in order to perform the initial setting of steering control of the power steering device, the torque detection means detects and indicates an initial torque which includes an origin torque corresponding to the assembling error in manufacturing and a residual torque generated due to the imperfect returning of the steering wheel. Of these torques, the origin torque cannot be eliminated unless the torque detection device is disassembled and adjusted, but exists as a peculiar value (i.e., constant value) for the device to be compensated easily. Therefore, the origin torque is relatively small in the influence upon the regular steering control insofar as the value thereof is specified at the time of the initial setting. With respect to the residual torque, on the contrary, where the same remains involved in the detection value of the initial toque at the time of the initial setting, the residual torque is liable to cause wrong steering control when the imperfect returning of the steering handle is corrected upon shifting to the normal steering control state. Thus, a power steering device of the rack assist type wherein the assist power generating means and the torque detection means are provided close to the steering shaft (rack shaft) as shown in the aforementioned Japanese '597 application becomes longer in distance between the steering handle and the torque detection means and therefore, is liable to be more influenced by the residual torque than that of the column assist type wherein the assist power generating means and the torque detection means are provided on a steering column, as shown in the aforementioned Japanese '656 application.

Whether the power steering devices are of the rack assist type or of the column type, heretofore, the assembling and inspection of the power steering devices in factories or the repair and the replacement of the same in car dealers have involved the following operations (i), (ii) and (iii) done by hand (by worker).

(i) The operation for holding the steering handle stationarily at the neutral position in the steering direction.
(ii) The operation for reducing (or eliminating) the residual torque existing as hysteresis, by rotating the steering handle about the handle axis a minute angle as the steering handle turns over alternatively.
(iii) The operation for detecting the initial torque by torque detection means with the steering handle being held stationarily at the neutral position in the steering direction.

However, where the aforementioned operation (ii) is performed by an unskillful worker, it is often the case that the elimination (reduction) of the residual torque becomes insufficient (imperfect) thereby to permit the residual torque to remain (included) in a detection value of the initial torque. This causes the steering control device to perform a wrong operation upon shifting to the regular steering control operation.

Further, even where the aforementioned operation (ii) is carried out reliably,. the detection of the initial torque cannot be done normally for the following reasons if the worker fails to perform the operation for holding the steering handle stationarily at the neutral position in the aforementioned operation (iii). This also causes the steering control device to perform a wrong operation upon shifting to the regular steering control operation. That is, the gravity center of the steering handle is usually eccentric (offset) from the axis of the handle axis, because it is usual that the steering handle is attached to a handle shaft to be inclined to the same and that due to the provision of an airbag or the like on the steering handle, the gravity center of the steering handle is not on the center of the handle ring. For this reason, in many cases, the gravity center of the steering handle is on the symmetrical position in the right-left direction, but is eccentric toward the driver side in the front-rear direction. Accordingly, where the initial torque is detected without holding the steering handle stationarily at the neutral position in the steering direction, the initial torque is detected as that to which the weight of the steering handle has been added as an applied torque.

Further, in order to reduce (ideally, to eliminate) the residual torque as the same becomes as small as zero in the aforementioned operation (ii), there is needed a long adjustment work by a skillful worker. This disadvantageously gives rise to problems such as an increase in the manufacturing cost, the adjustment error in car dealers due to the short of skillful mechanics and the like in installing power steering devices as standard accessories on vehicles.

SUMMARY OF THE INVENTION

Accordingly, it is a primary object of the present invention to provide an improved power steering device capable of preventing steering control from being wrongly performed even when the initial torque of a torque sensor cannot be detected normally due to a human error.

Another object of the present invention is to provide an improved power steering device which is capable of easily diminishing a residual torque to the level which no longer obstructs the steering control, without needing an experienced technical skill and a long adjustment work, so that there can be accomplished a reduced cost and stable performance.

Briefly, according to the present invention, there is provided a power steering device of the type wherein a steering torque applied to a handle shaft through a steering handle is detected by torque detection means which is provided with a torsion bar and a pair of angle detection sensors arranged apart from each other in the axial direction of the torsion bar and wherein a drive power corresponding to the steering torque is applied from assist power generating means to steerable wheels. The power steering device comprises initial torque detection command means for issuing a command to detect an initial torque which is generated primarily by the cause of the difference between origin positions of the pair of angle detection sensors. The power steering device further comprises initial torque judgment command means for detecting a first judgment torque value by the torque detection means with the steering handle being stopped at a first judgment position, after rotating the steering handle by the assist power generating means a predetermined rotational angle in one direction about the handle axis; then for detecting a second judgment torque value in the same manner with the steering handle being stopped at a second judgment position, after rotating the steering handle from the neutral position the same rotational angle in the other direction; and for issuing a command to judge whether the initial torque is normally detected or not, based on the first and second judgment torque values.

With this construction, there are utilized those already provided for steering control such as assist power generating means like an electric motor or the like and torque detection means composed of the torsion bar and the pair of angle detection sensors arranged apart in the axial direction of the torsion bar. Thus, without introducing a large scale facility for such judgment, it becomes possible to judge whether the initial torque is normal or not, prior to shifting to the regular steering control state. Accordingly, it can be realized to obviate the occurrence of a wrong operation in the steering control state even when the initial torque has not been normally detected, e.g., because the reduction or elimination of the residual torque was insufficient or imperfect or because the initial torque was detected with a failure to hold the steering handle stationarily at the neutral position in the steering direction.

In another aspect of the present invention, there is provided a power steering device of the type wherein a steering torque applied to a handle shaft through a steering handle is detected by torque detection means which is provided with a torsion bar and a pair of angle detection sensors arranged apart from each other in the axial direction of the torsion bar and wherein drive power corresponding to the steering torque is applied from assist power generating means to steerable wheels. The power steering device further includes initial torque detection command means which comprises first torque detection means for rotating the steering handle by the assist power generating means from the neutral position a predetermined rotational angle in one direction about the handle axis to a first position after the steering handle is held stationarily at the neutral position in the steering direction and for detecting a first torque value by the torque detection means with the steering handle being stopped at the first position. The first torque value includes a residual torque which exists as hysteresis between the steering handle and the torque detection means. The initial torque detection command means further comprises second torque detection means for rotating the steering handle from the neutral position the same rotational angle in the other direction and for detecting a second torque value also including another residual torque, with the steering handle being stopped at the second position. The initial torque detection command means further comprises initial torque setting means for calculating an average value of the first and second torque values thereby to cancel the positive and negative-going residual torques and for setting the calculated average value as an initial torque which is generated by the cause of the difference between origin positions of the pair of angle sensors.

With this construction, there are utilized those already provided for steering control such as assist power generating means like an electric motor or the like and torque detection means composed of the torsion bar and the pair of angle detection sensors arranged apart in the axial direction of the torsion bar. Thus, without introducing a large scale facility for such judgment, it becomes possible to judge whether the initial torque is normal or not, prior to shifting to the regular steering control state. That is, the detection of the initial torque by the torque detection means is performed as the assist power generating means cancels the positive and negative-going residual torques each other. Therefore, the residual torque included in the detected value of the initial torque is made small, and the steering control can be prevented from performing a wrong operation when it is shifted to the regular state, so that the stability in control can be improved. Consequently, with the positive and negative-going residual torques being canceled (eliminated), the origin torque which necessarily exists in the torque detection means composed of the torsion bar and the pair of angle sensors can be detected as precisely and quickly as possible as the initial torque which is to be detected in the initial setting of the power steering device.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 4 is an explanatory view showing the process steps of judging the initial torque in the routine shown in FIG. 3 in the first embodiment;

DETAILED DESCRIPTION OF THE PREFERRED EMBODIMENTS (First Embodiment)

Figure 1:
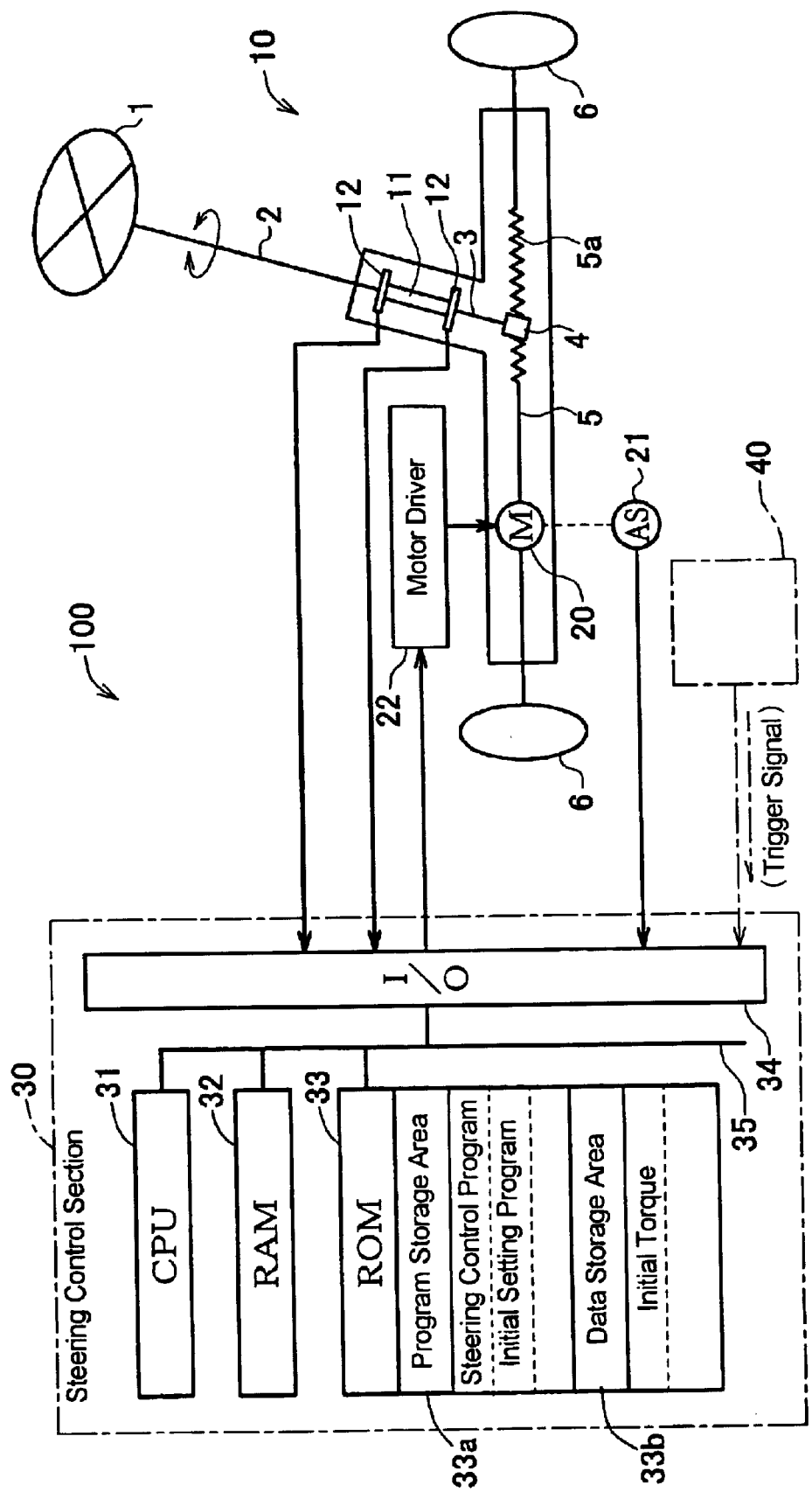
FIG. 1 is a schematic view showing the general construction of an electric power steering device as one example of a power steering device used commonly in the first and second embodiments according to the present invention.

Hereafter, a power steering device in the first embodiment according to the present invention will be described with reference to the accompanying drawings. FIG. 1 schematically shows the general construction of an electric power steering device as one example of the power steering devices to which the present invention is applied. Although the term "vehicle" herein means an automobile or motorcar, the present inventions is not limited only to the automobile or motorcar. The electric power steering device 100 (hereinafter referred to as "power steering device") has a steering handle 1 connected to a handle shaft 2, and a pinion shaft 3 connected to the handle shaft 2 through a torsion bar 11 is provided with a pinion 4, which is in meshing engagement with rack teeth 5a of a steering shaft 5. The steering shaft 5, when moved reciprocatively in its axial direction, causes the steered angle of the steerable wheels 6, 6 to be altered. Further, on the steering shaft 5 of the power steering device 100, a D.C. assist motor 20 as assist power generating means is assembled coaxially through a ball screw mechanism (not shown). Thus, the power steering device 100 is constructed as of the rack assist type that the drive power of the assist motor 20 assists the reciprocative movement of the steering shaft 5 given by the steering handle 1.

A torque sensor 10 serving as torque detection means is provided between the handle shaft 2 and the pinion shaft 3. The torque sensor 10 is composed of the torsion bar 11 and a pair of resolvers 12, 12 installed to be spaced apart in the axial direction of the torsion bar 11. The resolvers 12,12 serve as angle detecting sensors. When the steering handle 1 is turned to twist the torsion bar 11, the angular difference between the opposite ends of the torsion bar 11 is detected by the resolvers 12, 12, and the steering torque applied or given to the handle shaft 2 is detected based on the angular difference detected by the resolvers 12, 12 and the spring constant of the torsion bar 11. On the other hand, the rotational angular position of the assist motor 20 is detected by a motor angular position detecting section 21 including a rotary encoder or the like. The assist motor 20 driven through a motor driver 22 generates a drive power (rotational power) corresponding to the steering torque detected by the torque sensor 10 until the rotational angular position detected by the angular position detecting section 21 comes to coincidence with the rotational angular difference (i.e., steering angle of the steering handle 1) of the torsion bar 11 measured by the resolvers 12, 12.

A control unit or section 30 constituting the power steering device 100 includes a CPU (Central Processing Unit) 31, a RAM (Random Access Memory) 32, a ROM (Read-Only Memory) 33, an input/output interface 34 and the like, which are connected via a bus 35 for data transmission and receiving thereby to be constituted as a microcomputer. The ROM 33 has a program storage area 33a and data storage area 33b. The program storage area 33a has stored therein a steering control program for controlling the foregoing steering angle and the steering torque, an initial setting program referred to later, and the like. The data area 33b has stored therein an initial torque referred to later and performs the function as initial torque storage means. The CPU 31 performs various functions such as initial torque detection command means, initial torque judgment command means, initial torque storage command means, abnormality reporting command means and the like which will be described later.

The initial setting program stored in the program storage area 33a is designed for detecting an initial torque to store the same in the data storage area 33b and makes it possible to use the detected initial torque as a compensation value for the steering torque in the steering control program. In this particular embodiment, an initial setting program is prepared to be started upon receipt of a particular trigger signal transmitted from a small-sized tester (i.e., a portable terminal device) 40 which is temporally brought into connection with the input/output interface 34. Therefore, it is easy for dealer mechanics to perform the initial setting (i.e., detecting and storing the initial torque) of each power steering device to be repaired or adjusted in the dealer service site or repair shop. Of course, in a modified form, there may be utilized an external microcomputer which is equipped in a manufacturing plant or the like, in which case the initial setting program may be downloaded from the microcomputer by way of a communication line, a suitable storage medium or the like to the steering control section 30, and the initial setting program may be started upon receipt of a trigger signal from the external microcomputer.

When having the trigger signal input thereto, the CPU 31 reads the initial setting program from a program storage area 33a of the ROM 33 and executes at least the following processing of the read-out program in the order of steps described below. That is, the CPU 31:

(i) by the torque sensor 10, detects an initial torque which is primarily caused by the difference in origin position between the pairs of resolvers 12, 12.

(ii) detects a first judgment torque value by the torque sensor 10 after rotating the steering handle 1 a predetermined angle in one direction about the handle axis from the neutral position to stop the steering handle 1 to a first judgment position.

(iii) in the same manner, detects a second judgment torque value after rotating the steering handle 1 the same rotational angle in the other direction from the neutral position to stop the steering handle 1 to the second judgment position.

(iv) judges whether or not, the initial torque is that normally detected, by reference to the first and second judgment torque values.

(v) if the initial torque value is normal or correct, then stores the same as a compensation value for the steering torque in the data storage area 33b (i.e., initial torque storage means) of the steering control section 30.

(vi) if the initial torque value is abnormal or incorrect, then makes a report of such abnormality.

Desirably, the data storage area 33b may be constituted by an EPROM (Erasable Programming Read-Only Memory) so that the initial torque can be written thereinto each time the initial setting is done.

Figure 2:
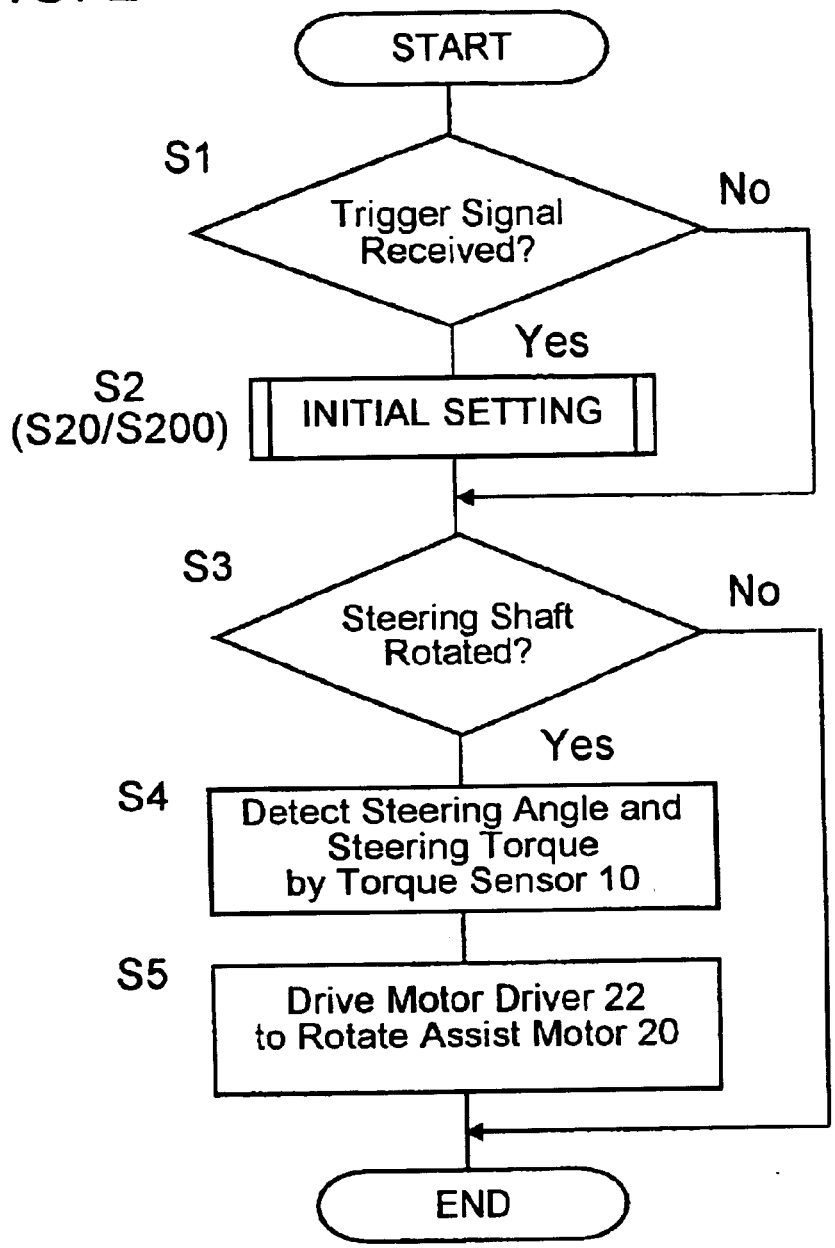
FIG. 2 is a flow chart of a steering control program for the electric power steering device shown in FIG. 1 and common to the first and second embodiments.

Next, the details of the steering control will be described with reference to the flow charts shown in FIGS. 2 and 3. FIG. 2 shows the general configuration of the steering control program, in accordance with which the CPU 31 watches for a trigger signal from the external device, and upon receipt of the trigger signal (YES at step S1), proceeds to the initial setting program S2 shown in FIG. 3. In the absence of the trigger signal (NO at step S1), the CPU 31 checks whether or not, the handle shaft 2 has begun to rotate with the steering handle 1, from the variation in the angular difference between the pair of resolvers 12, 12 (step S3). When the handle shaft 2 has begun to rotate (YES at step S3), the CPU 31 detects the steering angle of the handle shaft 2 and the steering torque by the torque sensor 10 (step S4). Then, the CPU 31 operates the motor driver 22 and drives the assist motor 20 to generate drive power corresponding to the steering torque detected by the torque sensor 10 until the rotational angular position detected by the angular position detecting section 21 comes into coincidence with the rotational angle difference between the opposite ends of the torsion bar 11 (i.e., the steering angle of the steering handle 1) measured by the resolvers 12, 12 (step S5). On the other hand, when the handle shaft 2 is not rotated (NO at step S3), the CPU 31 terminates the program to execute nothing.

Figure 3:
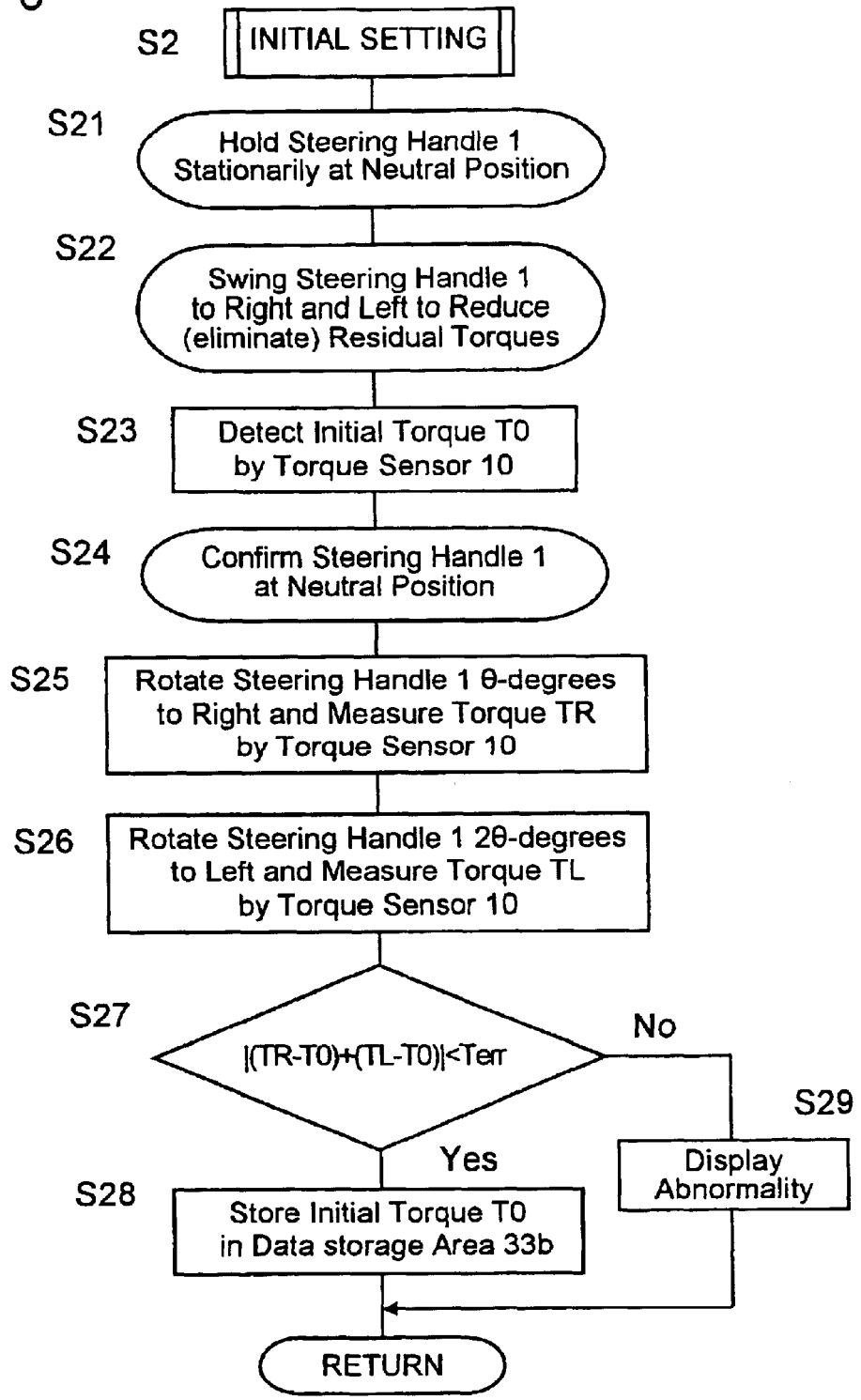
FIG. 3 is a flow chart of an initial setting program executed in the routine shown in FIG. 2 in the first embodiment.

FIG. 3 shows the details of the initial setting program S2. First of all, the CPU 31 at step S21 instructs the worker to rotate and hold the steering handle 1 stationarily at the neutral position in the steering direction, and thus, the worker does so in response thereto. Then, the CPU 31 further instructs the worker at step S22, so that the steering handle 1 is manually swung back and forth in the steering direction for rotational reciprocation within a minute rotational angle, thereby to reduce or eliminate the residual torque. Then, the CPU 31 detects the initial torque T0 (e.g., +0.2 N·m) by the torque sensor 10 (step S23). Herein, the CPU 31 makes the worker reconfirm (step S24) that the steering handle 1 has been held stationarily at the neutral position in the steering direction, as shown in FIG. 4(a)(i), and then, moves the routine to a normality judgment processing on the initial torque T0 detected at step S23. It is to be noted that in order to advance the routine from each of steps S21, S22, S24 to the next thereto, the program may be arranged to make the worker push a confirmation switch when the worker confirms that the steering handle 1 is being held stationarily at the neutral position.

In this judgment processing, at the beginning, the CPU 31 operates the assist motor 20 to rotate the steering handle 1 to a first judgment position which is away a predetermined angle θ in one direction about the handle axis from the neutral position (e.g., 45 degrees toward the right as shown in FIG. 4(a)(ii) and FIG. 4(b)(ii)), and then, detects a first judgment torque value TR with the steering handle 1 being held at the first judgment position (step S25). Then, the CPU 31 rotates the steering handle 1 to a second judgment position which is away the same angle in the other direction from the neutral position (e.g., 45 degrees toward the left, that is, 90 degrees towards the left from the first judgment position) as shown in FIG. 4(a)(iii) and FIG. 4(b)(iii), and then, detects a second judgment torque value TL in the same manner with the steering handle 1 being held at the second judgment position (step S26). Subsequently, the CPU 31 judges whether or not, the initial torque T0 is that having been normally detected, based on the first and second judgment torque values TR, TL (step S27). If the initial torque T0 is correct or normal, as is the case shown in FIG. 4(a), the CPU 31 stores the detected initial torque T0 as a compensation value for the steering torque in the data storage area 33b of the steering control section 30 (step S28). If the initial torque T0 is incorrect or abnormal, as is the case shown in FIG. 4(b), the CPU 31 displays the abnormality on a display monitor (step S29).

More specifically, first and second net applied torque values (TR−T0), (TL−T0) are calculated from the first and second judgment torque values TR, TL and the initial torque T0 and are added to cancel the positive and negative-going torque values each other. If the sum of the both net applied torque values (TR−T0), (TL−T0) are within a predetermined range, the detected initial torque is judged to be normal. If the sum is out of the predetermined range, it is judged to be abnormal. Further in detail, at step S27, the detected initial torque T0 is judged to be normal if the absolute value $|(TR-T0)+(TL-T0)|$ of the sum of the first and second net applied torque values (TR−T0), (TL−T0) is smaller than a threshold value Terr, while it is judged to be abnormal if the absolute value $|(TR-T0)+(TL-T0)|$ exceeds the threshold value Terr. In a modified form, the detected initial torque T0 may be judged to be normal if the absolute value $|(TR-T0)|-|(TL-T0)|$ of the difference between the first and second net applied torque values (TR−T0), (TL−T0) is smaller than the threshold value Terr, while it may be judged to be abnormal if the absolute value $|(TR-T0)|-|(TL-T0)|$ of such difference exceeds the threshold value Terr.

Accordingly, when the steering torque is detected at step S4 of the steering control program shown in FIG. 2, it is compensated for the initial torque T0 stored in the data storage area 33b. Thus, the assist motor 20 is operated based on the detected steering angle and the compensated steering torque, so that the power assist to the steering shaft 5 can be controlled faithfully in accordance with the torque applied by the driver to the steering handle 1.

The principle of judging the normality of the initial torque T0 can be explained as follows: That is, it may be the case that the steering handle 1 is mounted inclined to the handle shaft 2 and/or that the gravity center O1 of the steering handle 1 is not on the center O2 of the handle ring 1a due to the installation of an airbag or the like, as shown in FIG. 4(a)(i). In this case, the gravity center O1 of the steering handle 1 is eccentric or offset from the handle axis. For this reason, in many cases, the gravity center O1 of the steering handle 1 is on a symmetrical position in the right-left direction with respect to the handle axis, but is eccentric toward the driver side in the front-rear direction. Consequently, when the initial torque T0 is detected with the steering handle 1 being not held stationarily at the neutral potion in the steering direction, the initial torque T0 is taken as that including the weight of the steering handle 1 as an applied torque, as shown in FIG. 4(b)(i). Further, when the steering handle 1 is rotated to the first and second judgment positions in turn, the applied torque which is generated by the cause of the deviation (eccentricity) of the gravity center O1 of the steering handle 1 from the handle axis is added to the initial torque T0, so that the aforementioned absolute value $|(TR-T0)+(TL-T0)|$ (or $|(TR-T0)|-|(TL-T0)|$) exceeds the threshold value Terr.

As mentioned above, according to the initial toque judgment processing shown in FIG. 3, the abnormality judgment of the initial torque T0 is executed in such a way that the positive and negative-going torque values are canceled each other by obtaining the sum (or difference) of the first and second net applied torque values (TR−T0), (TL−T0) which can be led from the first and second judgment torque values TR, TL. Accordingly, the initial torque T0 can be obtained by turning the steering handle 1 once toward the right and once toward the left and by detecting each of the judgment torque values with the steering handle 1 being held stationarily at each of the turned positions.

In addition, if a predetermined time interval (e.g., 1 second) is set for the detection of the first and second judgment torque values TR, TL in the initial torque judgment processing, it becomes easier to find a wrong manipulation in reducing or eliminating the residual torque because the imperfect returning (i.e., hysteresis) of the steering handle 1 becomes liable to occur. Therefore, such a predetermined time interval is to be set as short as possible insofar as the imperfect returning (i.e., hysteresis) of the steering handle 1 can be reliably prevented from occurring.

The followings are the points to which cares are to be taken in executing the initial setting program stored in the steering control section 30 at inspection processes of manufacturing sites, factory floors or the like or at service sites of car dealers or the like.
(i) The initial setting program is to be started with the steering handle 1 being held stationarily at the neutral position in the steering direction.
(ii) No torque is to be applied from the external including the worker to the steering handle 1.
(iii) The assist motor 20 is to be operated by a battery with the same and an engine being installed on the vehicle.
(iv) It does not matter if the steerable wheels 6, 6 are to be kept touch on or off the floor.
(Modification)

Figure 5:
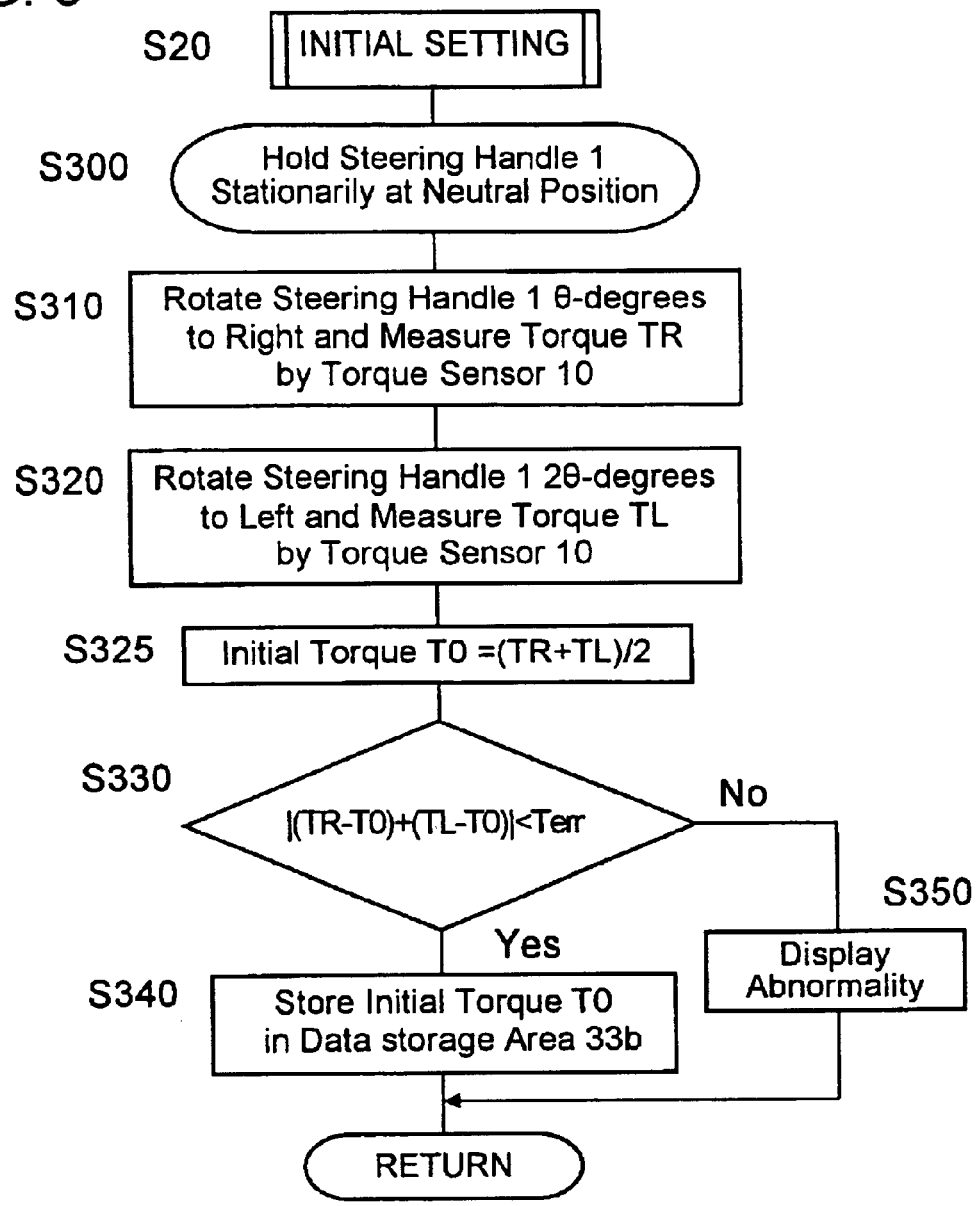
FIG. 5 is a flow chart showing a modified form of the initial setting program shown in FIG. 3.

FIG. 5 shows a flow chart modified from that shown in FIG. 3. An initial setting program S20 exemplified in FIG. 5 is composed of programs steps S300 through S350 to which the steps S21 through S29 shown in FIG. 3 are simplified.

In FIG. 5, first of all, the worker holds the steering handle 1 at the neutral position in the steering direction at step S300. Then, the steering handle 1 is rotated by the assist motor 20 a predetermined angle θ in one direction about the handle axis (e.g., 30 degrees toward the right) to be stopped at a first position (first judgment position), in which state a first torque value TR (first judgment torque value) is detected by the torque sensor 10 (step S310). Further, the steering handle 1 is rotated by the assist motor 20 the same angle θ in the other direction (e.g., 30 degrees toward the left ) from the neutral position to be stopped at a second position (second judgment position), in which state a second torque value TL (second judgment torque value) is detected in the same manner (step S320). Then, an average value of the first and second torque values TR, TL is calculated to cancel the positive and negative-going residual torques each other and is determined as an initial torque T0 which is generated primarily due to the difference between origin positions of the pair of resolvers 12, 12 (step S325). Further, at step S330, the initial torque T0 is judged to be normal if the absolute value |(TR−T0)+(TL−T0)| of the sum of the first and second net applied torque values (TR−T0), (TL−T0) which are led from the first and second torque values TR, TL, while it is judged to be abnormal if the absolute value |(TR−T0)+(TL−T0)| exceeds the threshold value Terr. When the detected initial torque T0 is normal, it is stored as a compensation value for the steering torque in the data storage area 33b of the steering control section 30 (step S340). When the initial torque T0 is abnormal, such abnormality is displayed on a display monitor (S350).

As described above, in this modified form, the first and second torque values TR, TL detected by the torque sensor 10 at steps S310 and S320 include the positive and negative-going residual torques which remain or exist in the form of hysteresis between the steering handle 1 and the torque sensor 10. However, the positive and negative-going residual torques are canceled by calculating the average value between the both torque values TR, TL, so that the initial torque T0 which is judged to be normal at step S330 primarily includes the origin torque (i.e., the difference between origin positions of the pair of resolvers 12, 12).

Further, in this modified form, the first judgment position and the second judgment position used in the initial torque judgment processing are made coincidence with the first position and second position detected in the initial torque detection proceeding, respectively. Accordingly, the manipulations or operations for the first and second torque values in the initial torque detection can be done as those for the first and second judgment torque values TR, TL, so that the time required for the initial setting can be shortened substantially.

In the foregoing first embodiment, the assist power generating means may be constituted by an electric motor such as a stepping motor or the like. In this modified case, it becomes possible to reliably assign the steering handle first and second judgment positions which are no more than ±45 degrees from the neutral position, so that the judgment of whether the initial torque is normal or not becomes easy. Further, when the initial torque is judged to be normal, the initial torque is stored as a compensation value for the steering torque in the steering control section 30 which is provided for performing the steering control for the power steering device 100, so that the stability and reliability can be improved in the steering control of the regular state. Further, where the initial torque is judged to be abnormal, the abnormality is reported by being displayed on a monitor screen, operating a speaker or the like, so that the worker is enabled to again perform the operation for reducing or eliminating the positive and negative-going residual torques, the processing for detecting the initial torque or the like.

In the foregoing first embodiment, the initial torque detection command means, the initial torque judgment command means, the initial torque storage command means and the abnormality reporting command means may be stored along with the initial setting program in the steering control section 30, and the initial setting program may be initiated in response to a particular trigger signal transmitted from an external device which is provided other than the vehicle mounting the power steering device. For example, if there can be used a portable terminal device (small-sized tester or the like) which is capable of transmitting the particular trigger signal to the steering control section 30 of the vehicle, it becomes possible to perform the initial setting of the steering control section 30 without bringing the same into a manufacturing factory. Therefore, it becomes easier for car dealers to perform at their service sites the repair and replacement of various components and assemblies thereof which constitute the power steering device 100.

Further, if a predetermined time interval is set for the detection of the first and second judgment torque values in the initial torque judgment processing, the incomplete returning (i.e., hysteresis) of the steering handle 1 is liable to occur by the cause of the friction or the like in a drive train between the first judgment position and the second judgment position. Consequently, it becomes easier to find a bad manipulation in reducing or eliminating the residual torques, so that the occurrence of the wrong operation in the steering control state can be obviated.

In addition, in the initial torque judgment command means, the positive and negative-going residual torques can be canceled each other by obtaining the sum of the first and second net applied torque values which are led from the first and second judgment torque values, and the detected initial torque is judged to be normal if the sum of the both net applied torque values is within the predetermined range, but is judged to be abnormal if the sum is out of the predetermined range. Thus, the initial torque can be obtained only by detecting the judgment torque once in each of different directions, so that it can be realized to quickly carry out the initial setting (i.e., storing of the compensation value in the steering control).

(Second Embodiment)

Figure 6:
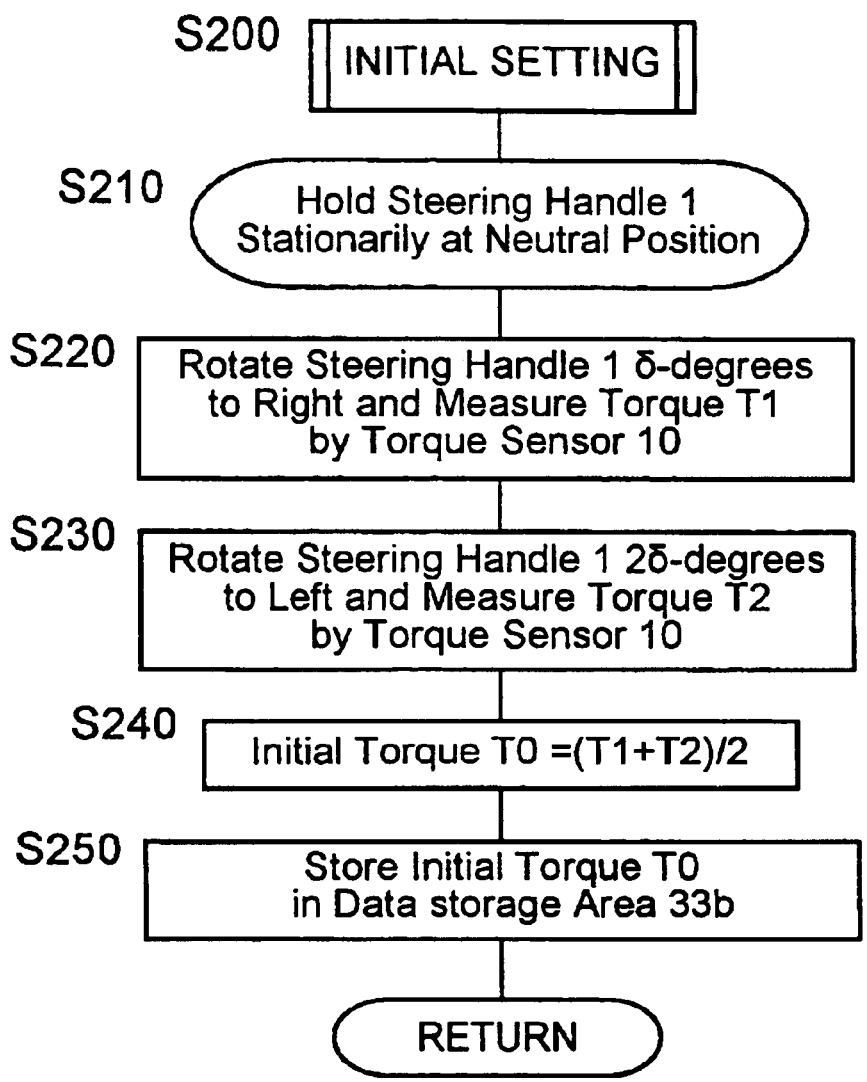
FIG. 6 is a flow chart of an initial setting program executed in the routine shown in FIG. 2 in the second embodiment.

Next, a power steering device 100 in the second embodiment will be described in detail with reference to FIGS. 1, 2 and 6. The power steering device 100 in the second embodiment takes the same construction as that shown in FIG. 1 and is controlled in accordance with the steering control program shown in FIG. 2 whose initial setting program S2 is altered as shown in FIG. 6. Therefore, the descriptions as to the construction shown in FIG. 1 and as to the operation thereof in accordance with the steering control program shown in FIG. 2 apply in this second embodiment.

In the second embodiment, when having the trigger signal input thereto, the CPU 31 reads the initial setting program from the program storage area 33a of the ROM 33 and executes at least the following processing of the read-out program in the order of steps described below. That is, the CPU 31:

(i) operates the assist motor 20 to rotate the steering handle 1 which is being stationarily held at the neutral position in the steering direction, through a predetermined rotational angle in one direction about the handle axis and to position the steering handle 1 at a first position, and then, detects by the torque sensor 10 a first torque value including a residual torque which exists as hysteresis between the steering handle 1 and the torque sensor 10.

(ii) then by the assist motor 20, rotates the steering handle 1 the same rotational angle in the other direction from the neutral position to stop the steering handle 1 at a second position and detects a second torque value including a residual torque, by the torque sensor 10 with the steering handle 1 being held at the second position.

(iii) calculates an average value between the first and second torque values thereby to cancel the positive and negative-going residual torques each other and determines the calculated average value as the initial torque which is generated primarily due to the difference between origin positions of the pair of resolvers 12, 12.

(iv) stores the determined initial torque as a compensation value for the steering torque in the data storage area 33b (i.e., initial torque storage means) of the steering control section 30.

Like the first embodiment, the data storage area 33b in this second embodiment may be constituted by an EPROM (Erasable Programmable Read-Only Memory) so that the initial torque can be written thereinto each time the initial setting is done.

FIG. 6 shows the initial setting program S200 which is executed at step S2 of the steering control program shown in FIG. 2. That is, in the initial setting operation in this particular embodiment, the worker holds the steering handle 1 stationarily at the neutral position in the steering direction at step S210. Then, the CPU 30 operates the assist motor 20 to rotate the steering handle 1 a predetermined rotational angle δ in one direction about the handle axis (e.g., 5 degrees toward the right) and to stop the steering handle 1 at the first position and detects the first torque value T1 by the torque sensor 10 (step S220). Further, the CPU 30 rotates the steering handle 1 by the assist motor 20 the same rotational angle δ in the other direction from the neutral position (e.g., 5 degrees toward the left, that is, 10 degrees from the first position toward the left) to stop the steering handle 1 at the second position and detects the second torque value T2 in the same manner (step S230). The CPU 31 then calculates an average value between the first and second torque values T1, T2 thereby to cancel the positive and negative-going residual torques and determines the calculated average value as the initial torque T0 (step S240) which is generated due to the difference between origin positions of the pair of resolvers 12, 12. Thereafter, the CPU 31 stores the calculated initial torque T0 as a compensation value for the steering torque in the data storage area 33b of the steering control section 30 (step S250).

Accordingly, when the steering torque is detected at step S4 of the steering control program shown in FIG. 2, it is compensated for the initial torque T0 stored in the data storage area 33b. Thus, the assist motor 20 is operated based on the detected steering angle and the compensated steering torque, so that the power assist to the steering shaft 5 can be controlled faithfully in accordance with the torque applied by the driver to the steering handle 1.

The positive and negative-going residual torques each remaining between the steering handle 1 and the torque sensor 10 are included respectively in the first and second torque values T1, T2 detected by the torque sensor 10. However, the positive and negative-going residual torques are canceled each other by calculating the average value of the both torque values T1, T2. Therefore, the initial torque T0 can be composed mainly of the origin torque which is generated due to the difference between the origin positions of the pair of resolvers 12, 12.

In this way, in accordance with the initial torque detection operation shown in FIG. 6, the operation can be completed in a short time period because the initial torque is obtained by detecting the first and second torque values and by calculating the average values therebetween.

Like steps S21, S22 and S24 shown in FIG. 3, step S210 may be arranged to make the worker push a confirmation switch when the worker confirms that the steering handle 1 is being held stationarily at the neutral position. Therefore, the routine can proceed from step S210 to the next step S220 when the confirmation switch is pushed.

Further, where plural first torque values and plural second torque values are detected with or without altering the rotational angle of the steering handle 1 in the initial torque detection operation, the accuracy in canceling or eliminating the positive and negative-going residual torques can be enhanced, so that it can be realized to detect the origin torque precisely.

The followings are the points to which cares to be drawn in executing the initial setting program stored in the steering control section 30 at inspection processes of manufacturing sites, factory floors or the like or at service sites of car dealers or the like.

(i) The program is to be started with the steering handle 1 being held stationarily at the neutral position in the steering direction.

(ii) No torque is to be applied from the external including the worker to the steering handle 1.

(iii) The assist motor 20 is to be operated by a battery with the same and an engine being installed on the vehicle.
(iv) It does not matter if the steerable wheels 6, 6 are to be kept touch on or off the floor.

In the foregoing second embodiment, the assist power generating means may be constituted by an electric motor such as a stepping motor or the like. In this modified case, it becomes possible to stop the steering handle 1 at each of first and second judgment positions reliably in the angular range of ±5 degrees. Therefore, it can be realized to perform the adjustment work (i.e., operation for reducing the residual torques) as done by a skillful worker. Further, after the positive and negative-going residual torques are canceled or eliminated, the detected initial torque T0 is stored as a compensation value for the steering torque in the steering control section 30 which is provided for performing the steering control for the power steering device 100, so that the stability can be improved in the steering control of the regular state.

In the foregoing second embodiment, the initial torque detection command means and the initial torque storage command means may be stored along with the initial setting program in the steering control section (unit) 30, and the initial setting program may be initiated in response to the particular trigger signal transmitted from an external device 40 which is provided other than the motor vehicle mounting the power steering device 100. For example, if there can be used a portable terminal device 40 (small-sized tester or the like) which is capable of transmitting the particular trigger signal to the steering control section 30 of the vehicle, it becomes possible to perform the initial setting of the steering control section 30 without bringing the same into a manufacturing factory therefor. Therefore, it becomes easier for car dealers to perform the repair and replacement of various components and the assemblies thereof which constitute the power steering device 100.

Further, in the foregoing second embodiment, if a predetermined time interval is set for the detection of the first and second judgment torque values in the initial torque judgment processing, the imperfect returning (i.e., hysteresis) of the steering handle is liable to occur by the cause of the friction or the like in the drive train between the first judgment position and the second judgment position. Consequently, it becomes easier to find a wrong manipulation in reducing or eliminating the residual torque.

Further, where plural first torque values and plural second torque values are detected with or without altering the rotational angle of the steering handle 1 in the initial torque detection operation, the accuracy in canceling (eliminating) the positive and negative-going residual torques can be enhanced, so that it can be realized to detect the origin torque precisely.

Although the power steering device of the rack assist type only has been exemplified in the foregoing descriptions, it is needless to say that the present invention is applicable to that of column assist type. Moreover, insofar as the steering handle 1 and the steerable wheels 6, 6 are connected mechanically, the present invention may be practiced in power steering devices of the type that the steering force is variable, such as for example a speed responsive type, a rotational speed responsive type or the like. Furthermore, hydraulic motor, hydraulic cylinder or the like besides electric motor may be used to constitute the assist power generating means.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering device wherein a steering torque applied to a handle shaft through a steering handle is detected by torque detection means which is provided with a torsion bar and a pair of angle detection sensors arranged apart from each other in an axial direction of said torsion bar and wherein a command signal is issued from a steering control section for applying a drive power corresponding to said steering torque from an electric motor as assist power generating means to steerable wheels, said power steering device comprising:

initial torque detection command means including:
   (a) first torque detection means for rotating said steering handle a predetermined rotational angle in one direction about the handle axis to a first position after said steering handle is held stationarily at a neutral position in the steering direction and for detecting a first torque value by said torque detection means with said steering handle being stopped at said first position, said first torque value including a residual torque which exists as hysteresis between said steering handle and said torque detection means;
   (b) second torque detection means for rotating said steering handle by said electric motor from said neutral position the same rotational angle in the other direction and for detecting a second torque value, also including another residual torque, by said torque detection means with said steering handle being stopped at said second position; and
   (c) initial torque setting means for calculating an average value of said first and second torque values to cancel positive and negative-going residual torques included said first and second torque values and for setting said calculated average value as an initial torque which is generated by the cause of the difference between origin positions of said pair of angle sensors; and
   initial torque storage command means for issuing a command to store said initial torque as a compensation value for said steering torque in initial torque storage means of said steering control section.

2. The power steering device as set forth in claim 1, wherein:
   said initial torque detection command means and said initial torque storage command means are stored along with an initial setting program in said steering control section; and
   said initial setting program is able to be initiated in response to a particular trigger signal transmitted from an external device which is provided other than a vehicle installing said power steering device thereon.

3. The power steering device as set forth in claim 1, wherein:
   a predetermined time interval is set in said initial torque command means for detecting said first and second torque values.

4. The power steering device as set forth in claim 1, wherein:
   said initial torque detection command means detects each of said first and second torque values plural times with or without altering the rotational angle of said steering handle.

* * * * *